(12) United States Patent  (10) Patent No.: US 7,207,856 B2
Ishida et al.  (45) Date of Patent: Apr. 24, 2007

(54) ENGINE CONTROL DEVICE (75) Inventors: Yasuhiko Ishida, Hyogo (JP);
Yoshimasa Kinoshita, Shizuoka-ken (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/083,290

(22) Filed: Mar. 17, 2005

(65) Prior Publication Data

US 2006/0160440 A1 Jul. 20, 2006

(30) Foreign Application Priority Data

Jan. 14, 2005 (JP) ............................. 2005-007553

(51) Int. Cl.
*B63H 21/21* (2006.01)
(52) U.S. Cl. .................. 440/87; 114/144 R; 440/1
(58) Field of Classification Search ............ 114/144 R; 440/1, 2, 84, 85, 86, 87; 123/339.11, 339.19
See application file for complete search history.

(56) References Cited

U.S. PATENT DOCUMENTS

| 3,183,879 | A |   | 5/1965 | Heidner |
|---|---|---|---|---|
| 4,423,630 | A |   | 1/1984 | Morrison |
| 4,445,473 | A |   | 5/1984 | Matsumoto |
| 4,492,195 | A | * | 1/1985 | Takahashi et al. ...... 123/339.11 |
| 4,556,005 | A |   | 12/1985 | Jackson |
| 4,767,363 | A |   | 8/1988 | Uchida et al. |
| 4,949,662 | A |   | 8/1990 | Kobayashi |
| 4,961,396 | A |   | 10/1990 | Sasagawa |
| 4,971,584 | A |   | 11/1990 | Inoue et al. |
| 4,972,792 | A |   | 11/1990 | Yokoyama et al. |
| 4,989,533 | A |   | 2/1991 | Horiuchi |
| 5,094,182 | A |   | 3/1992 | Simner |
| 5,113,777 | A |   | 5/1992 | Kobayashi |

(Continued)

FOREIGN PATENT DOCUMENTS

CA 2271332 2/2000

(Continued)

OTHER PUBLICATIONS

Co-Pending U.S. Appl. No. 11/082,256, filed Mar. 17, 2005. Title: Engine Control Device. Inventors: Yasuhiko Ishida et al.

(Continued)

*Primary Examiner*—Lars A. Olson
(74) *Attorney, Agent, or Firm*—Knobbe, Martens, Olson & Bear, LLP (57) ABSTRACT

An engine control device can include a throttle valve for adjusting an amount of air supplied to an engine, operation amount detecting sensors for detecting an operation amount of a throttle lever, a motor for driving the throttle valve between open and closed positions according to detection values of the operation amount detecting sensor 21*a* or the like, and throttle opening detecting sensors for detecting an opening of the throttle valve is provided with a limp-home mechanism for keeping the throttle valve in a mechanically neutral position when an abnormality occurs. When the throttle valve is in the mechanically neutral position, an ignition timing control can be switched in a stepwise manner over a predetermined time period from a regular ignition timing control to a limp-home ignition timing control.

16 Claims, 7 Drawing Sheets

U.S. PATENT DOCUMENTS

| | | | |
|---|---|---|---|
| 5,118,315 A | 6/1992 | Funami et al. |
| 5,144,300 A | 9/1992 | Kanno |
| 5,167,547 A | 12/1992 | Kobayashi et al. |
| 5,169,348 A | 12/1992 | Ogiwara et al. |
| 5,184,589 A | 2/1993 | Nonaka |
| 5,199,261 A | 4/1993 | Baker |
| 5,203,727 A | 4/1993 | Fukui |
| 5,244,425 A | 9/1993 | Tasaki et al. |
| 5,350,325 A | 9/1994 | Nanami |
| 5,352,138 A | 10/1994 | Kanno |
| 5,366,394 A | 11/1994 | Kanno |
| 5,367,970 A | 11/1994 | Beauchamp et al. |
| 5,408,948 A | 4/1995 | Arii et al. |
| 5,429,533 A | 7/1995 | Kobayashi et al. |
| 5,474,007 A | 12/1995 | Kobayashi |
| 5,520,133 A | 5/1996 | Wiegert |
| 5,538,449 A | 7/1996 | Richard |
| 5,591,057 A | 1/1997 | Dai et al. |
| 5,603,644 A | 2/1997 | Kobayashi et al. |
| 5,665,025 A | 9/1997 | Katoh |
| 5,687,694 A | 11/1997 | Kanno |
| 5,697,317 A | 12/1997 | Pereira |
| 5,707,264 A | 1/1998 | Kobayashi et al. |
| 5,713,297 A | 2/1998 | Tani et al. |
| 5,839,700 A | 11/1998 | Nedderman, Jr. |
| 5,904,604 A | 5/1999 | Suzuki et al. |
| 5,908,006 A | 6/1999 | Ibata |
| 5,941,188 A | 8/1999 | Takashima |
| 5,988,091 A | 11/1999 | Willis |
| 6,032,605 A | 3/2000 | Takashima |
| 6,032,653 A | 3/2000 | Anamoto |
| 6,038,995 A | 3/2000 | Karafiath et al. |
| 6,062,154 A | 5/2000 | Ito |
| 6,086,437 A | 7/2000 | Murray |
| 6,135,095 A | 10/2000 | Motose et al. |
| 6,138,601 A | 10/2000 | Anderson et al. |
| 6,148,777 A | 11/2000 | Motose et al. |
| 6,159,059 A | 12/2000 | Bernier et al. |
| 6,168,485 B1 | 1/2001 | Hall et al. |
| 6,171,159 B1 | 1/2001 | Shen et al. |
| 6,174,210 B1 | 1/2001 | Spade et al. |
| 6,178,907 B1 | 1/2001 | Shirah et al. |
| 6,202,584 B1 | 3/2001 | Madachi et al. |
| 6,213,044 B1 | 4/2001 | Rodgers et al. |
| 6,216,624 B1 | 4/2001 | Page |
| 6,227,919 B1 | 5/2001 | Blanchard |
| 6,244,914 B1 | 6/2001 | Freitag et al. |
| 6,273,771 B1 | 8/2001 | Buckley et al. |
| 6,305,307 B1 | 10/2001 | Yokoya |
| 6,314,900 B1 | 11/2001 | Samuelsen |
| 6,332,816 B1 | 12/2001 | Tsuchiya et al. |
| 6,336,833 B1 | 1/2002 | Rheault et al. |
| 6,336,834 B1 | 1/2002 | Nedderman, Jr. et al. |
| 6,386,930 B2 | 5/2002 | Moffet |
| 6,390,862 B1 | 5/2002 | Eichinger |
| 6,405,669 B2 * | 6/2002 | Rheault et al. ......... 114/144 R |
| 6,415,729 B1 | 7/2002 | Nedderman, Jr. et al. |
| 6,428,372 B1 | 8/2002 | Belt |
| 6,443,785 B1 | 9/2002 | Swartz et al. |
| 6,478,638 B2 | 11/2002 | Matsuda et al. |
| 6,508,680 B2 | 1/2003 | Kanno |
| 6,511,354 B1 | 1/2003 | Gonring et al. |
| 6,523,489 B2 | 2/2003 | Simzrd et al. |
| 6,530,812 B2 | 3/2003 | Koyano et al. |
| 6,551,152 B2 * | 4/2003 | Matsuda et al. ............... 440/1 |
| 6,565,397 B2 | 5/2003 | Nagafusa |
| 6,568,968 B2 * | 5/2003 | Matsuda ...................... 440/87 |
| 6,668,796 B2 | 12/2003 | Umemoto et al. |
| 6,695,657 B2 | 2/2004 | Hattori |
| 6,709,302 B2 | 3/2004 | Yanagihara |
| 6,709,303 B2 * | 3/2004 | Umemoto et al. ............. 440/1 |
| 6,722,932 B2 | 4/2004 | Yanagihara |
| 6,732,707 B2 | 5/2004 | Kidokoro et al. |
| 6,733,350 B2 | 5/2004 | Iida et al. |
| 6,776,676 B2 | 8/2004 | Tanaka et al. |
| 6,805,094 B2 | 10/2004 | Hashimoto et al. |
| 6,827,031 B2 | 12/2004 | Aoyama |
| 6,855,014 B2 | 2/2005 | Kinoshita et al. |
| 6,884,128 B2 | 4/2005 | Okuyama et al. |
| 6,886,529 B2 | 5/2005 | Suzuki et al. |
| 6,990,953 B2 * | 1/2006 | Nakahara et al. ...... 123/339.19 |
| 6,997,763 B2 | 2/2006 | Kaji |
| 2002/0049013 A1 | 4/2002 | Kanno |
| 2003/0000500 A1 | 1/2003 | Chatfield |
| 2004/0067700 A1 | 4/2004 | Kinoshita et al. |
| 2004/0069271 A1 | 4/2004 | Kanno et al. |
| 2004/0147179 A1 | 7/2004 | Mizuno et al. |
| 2005/0263132 A1 | 12/2005 | Yanagihara |
| 2005/0273224 A1 | 12/2005 | Ito et al. |
| 2005/0287886 A1 | 12/2005 | Ito et al. |
| 2006/0004502 A1 | 1/2006 | Kaneko et al. |
| 2006/0037522 A1 | 2/2006 | Kaneko et al. |

FOREIGN PATENT DOCUMENTS

| | | |
|---|---|---|
| JP | 06-137248 | 5/1994 |
| JP | 7-40476 | 9/1995 |
| JP | 2001-152895 | 6/2001 |
| JP | 2001-329881 | 11/2001 |
| JP | 2002-180861 | 6/2002 |
| JP | 2004-092640 | 3/2004 |
| JP | 2004-137920 | 5/2004 |
| WO | WO 00/40462 | 7/2000 |

OTHER PUBLICATIONS

Co-Pending U.S. Appl. No. 11/082,792, filed Mar. 17, 2005. Title: Engine Control Device. Inventor: Yoshimasa Kinoshita.

Co-Pending U.S. Appl. No. 11/335,996, filed Jan. 20, 2006. Now published as U.S. 2006-0160437A1 (submitted herewith). Title: Operation Control System for Small Boat. Inventor: Kinoshita et al.

Co-Pending U.S. Appl. No. 11/336,711, filed Jan. 20, 2006. Now published as US 2006-0160438A1 (submitted herewith). Title: Operation Control System for Planing Boat. Inventor: Kinoshita et al.

Co-Pending U.S. Appl. No. 11/146,980, filed Jun. 7, 2005. Now published as US 2006-0037522A1 (submitted herewith). Title: Steering-Force Detection Device for Steering Handle of Vehicle. Inventor: Kaneko et al.

Co-Pending U.S. Appl. No. 11/146,728, filed Jun. 7, 2005. Now published as US 2006-0004502A1 (submitted herewith). Title: Steering Force Detection Device for Steering Handle of Vehicle. Inventor: Kaneko et al.

Co-Pending U.S. Appl. No. 11/169,374, filed Jun. 29, 2005. Now published as US 2005-0287886A1 (submitted herewith). Title: Engine Output Control System for Water Jet Propulsion Boat. Inventor: Ito et al.

Co-Pending U.S. Appl. No. 11/135,890, filed May 24, 2005. Now published as US 2005-0273224A1 (submitted herewith). Title: Speed Control Device for Water Jet Propulsion Boat. Inventor: Ito et al.

Co-Pending U.S. Appl. No. 10/624,094, filed Jul. 21, 2003. Now issued as US Patent No. 7,037,147 (submitted herewith). Title: Engine Control System for Watercraft. Inventor: Ito et al.

Co-Pending U.S. Appl. No. 10/619,333, filed Jul. 14, 2003. Now issued as US Patent No. 7,089,910 (submitted herewith). Title: Watercraft Propulsion System and Control Method of the Systemengine Control System for Watercraft. Inventor: Kanno et al.

Co-Pending U.S. Appl. No. 10/872,013, filed Jun. 18, 2004. Now published as US 2005-0085141A1 (submitted herewith). Title: Engine Control Arrangement for Watercraft. Inventor: Motose.

Co-Pending U.S. Appl. No. 10/862,267, filed Jun. 7, 2004. Now published as US 2005-0009419A1 (submitted herewith). Title: Engine control Arrangement for Watercraft. Inventor: Kinoshita.

Co-Pending U.S. Appl. No. 11/451,904, filed on Jun. 12, 2006 Title: Operation Control System for Planning Boat.

Advertisement for trim adjuster for Sea-Doo watercraft - Personal Watercraft Illustrated, Aug. 1998.

Advertisement for trim adjuster - Jet Sports, Aug. 1997.

Advertisement for Fit and Trim and Fit and Trim II - Jet Sports. Aug. 1996.

* cited by examiner

ENGINE CONTROL DEVICE

PRIORITY INFORMATION

This application is based on and claims priority under 35 U.S.C. §119 to Japanese Patent Application No. 2005-007553, filed on Jan. 14, 2005, the entire contents of which is hereby expressly incorporated by reference herein.

BACKGROUND OF THE INVENTION

1. Field of the Inventions

The present inventions relate to an engine control device including ignition timing control functions.

2. Description of the Related Art

Water jet propulsion boats, some of which are referred to as "personal watercraft" are provided with a throttle lever disposed in the vicinity of a grip of the steering handlebars. The engines of such watercraft propel the watercraft according to operation of the throttle lever. The heading of the watercraft is changed according to operation of the handlebars.

Recently, several personal watercraft manufacturers have incorporated into such watercraft, systems which can raise engine output when an operator operates the steering handlebars by a large amount while not operating the throttle lever. For example, such a system is disclosed in Japanese Patent Publication JP-A-2001-329881. This type f system can improve steerability of the water jet propulsion boat when it docks while coasting, or the like.

Some of such personal watercraft include throttle opening detection means for detecting the opening of a throttle valve that opens and closes according to operation of the throttle lever as well as steering angle detection means for detecting the steering angle of the steering handlebars. These watercraft can also include running speed detection means for detecting the running speed of the watercraft, and engine output control means for controlling the engine output.

The engine output control means can be configured to increase the engine output when a value corresponding to the throttle opening detected by the throttle opening detection means is not more than a predetermined value, a value corresponding to the steering angle detected by the steering angle detection means is not less than a predetermined value, and a value corresponding to the running speed detected by the running speed detection means is not less than a predetermined value.

SUMMARY OF THE INVENTIONS

An aspect of at least one of the embodiments disclosed herein includes the realization that, in the conventional watercraft noted above, in some cases, engine speed exceeds or does not reach a target speed during a throttle/steering assist operation, due to variations in the manufacture of the engine, variations in the operation of an actuator for opening and closing the throttle valve, or the like. For example, after prolonged use, a throttle valve or throttle valve shaft can become sticky, and thus will not move as fast as when the throttle valve was new. To solve such problems, strict predetermined settings, accuracy and the like in the associated mechanical designs can be used, however, such results in cost increases and more complicated and time-consuming maintenance procedures. On the other hand, adjustment of ignition timing during such operational modes can be used to compensate for the change in performance of the engine components, thereby preventing the occurrence of variation in engine speed by controlling ignition timing without cost increase and degraded maintainability.

Thus, in accordance with an embodiment, an engine control device comprises a throttle opening detection device configured to detect an opening of a throttle valve. An operation load detection device is configured to detect an operation load of steering handlebars. A rotational speed detection device is configured to detect a speed of an engine. An engine speed control device is configured to increase the speed of an engine when a value detected by the throttle opening detection device is smaller than a predetermined value and when a value detected by the operation load detection device is greater than a predetermined value. Additionally, an ignition timing control device is configured to compute a difference between a detection value from the rotational speed detection device and a preset target engine speed and to adjust ignition timing of an engine based on the computed value, when the engine speed is increased by the control of the engine speed control device.

BRIEF DESCRIPTION OF THE DRAWINGS

These and other features and advantages of the inventions, features, aspects, and embodiments will become more apparent upon reading the following detailed description and with reference to the accompanying drawings of an embodiment that exemplifies the invention. The drawings comprise eight figures.

DETAILED DESCRIPTION OF THE PREFERRED EMBODIMENTS

Figure 1:
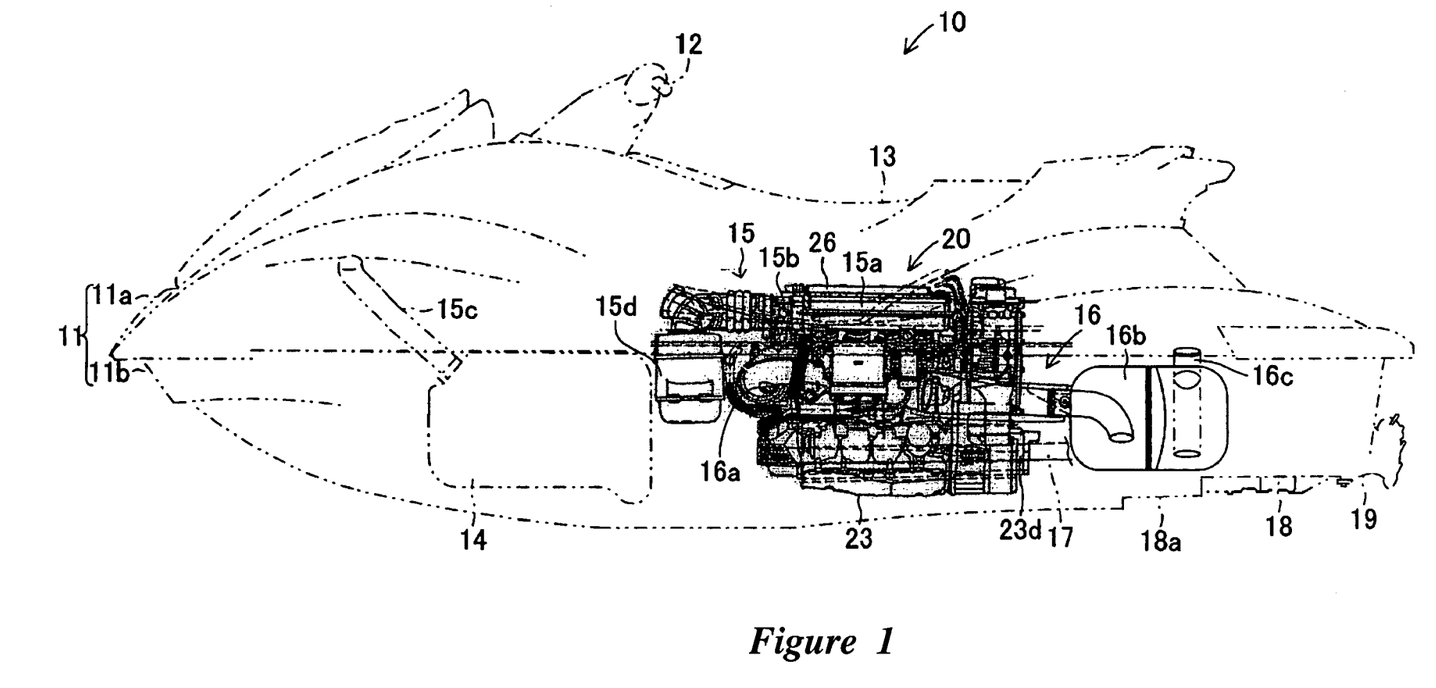
FIG. 1 is a side elevational view of a small watercraft with an engine control device according to an embodiment.

An embodiment is described below with reference to the drawings. FIG. 1 shows a personal water-jet propulsion watercraft 10 with an engine control device 20. The embodiments disclosed herein are described in the context of a personal watercraft because these embodiments have particular utility in this context. However, the embodiments and inventions herein can also be applied to other marine vessels, such as and small jet boats, as well as other vehicles.

With reference to FIG. 1, in the boat 10, a boat body 11 is formed of a deck 11a and a lower hull 11b. A steering handle 12 is provided in the upper part of the boat body 11 at a portion, forwardly of the center. A seat 13 is provided in the upper part of the boat body 11 at about the middle of the boat 10. The steering handle 12, also shown in FIG. 2, is mounted to the upper end of a steering shaft 12a provided in the boat body 11, for rotation about or with the steering shaft 12a.

Figure 2:
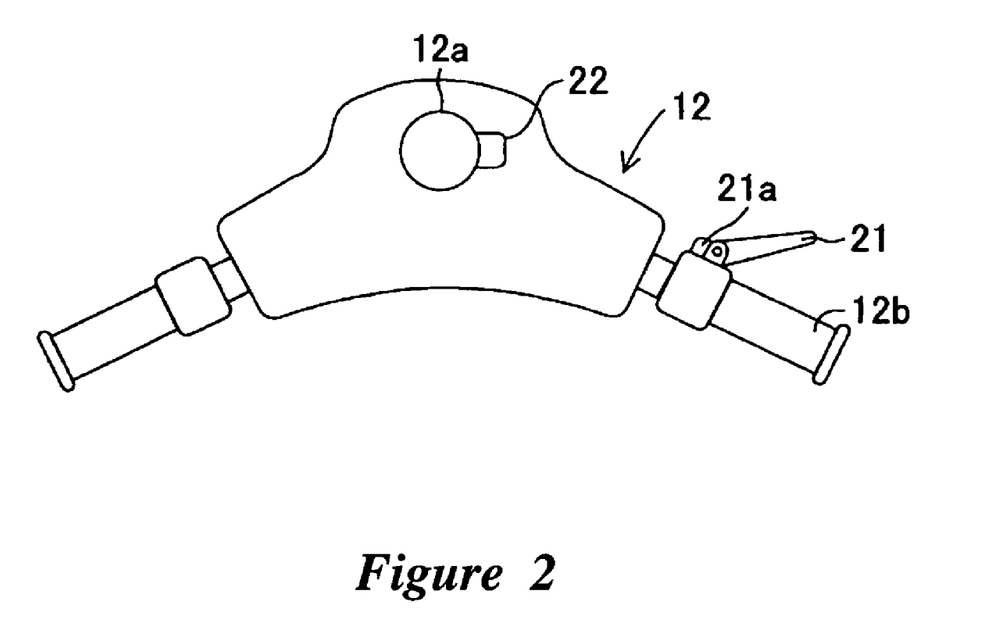
FIG. 2 is a plan view of a steering handle of the watercraft of FIG. 1.

With reference to FIG. 2, in the vicinity of a grip 12b on the right side (on the starboard side) of the steering handle 12 is provided a throttle lever 21 for rotation about its base-end side portions, although other configurations can also be used. The throttle lever 21 is movable toward the grip 12b through a driver's operation, with, for example, an operator's finger, although other configurations can also be used. When the lever 21 is not being depressed, the lever is held separated from the grip 12b, by a spring, for example. In the base section of the throttle lever 21 is provided an amount-of-operation sensor 21a for detecting the amount of operation (amount of rotation) of the throttle lever 21. The sensor 21a can be any type of sensor. One type of sensor that can be used is, for example, but without limitation, a rheostat configured to output a voltage indicative of the angular position of the lever 21a, however, other sensors can also be used.

The watercraft 10 can also include a steering angle sensor 22 configured to detect an angular displacement of the steering handle 12. For example, the steering angle sensor 22 can be mounted in the vicinity of the steering shaft 12a and configured to detecting the rotational angle of the steering shaft 12a (steering handle 12), and or the angular velocity of the steering handle. However, other sensors can also be used.

With reference to FIG. 1, in the bottom of the body 11 at the forward portion thereof is disposed a fuel tank 14 for storing fuel. In the bottom of the hull 11b at the middle portion thereof is disposed an engine 23.

To the engine 23 are connected an intake device 15 for sending a mixture of air and fuel supplied from the fuel tank 14, and an exhaust device 16 for discharging exhaust gas delivered from the engine 23, from the rear end of the body 11 to the outside.

Figure 3:
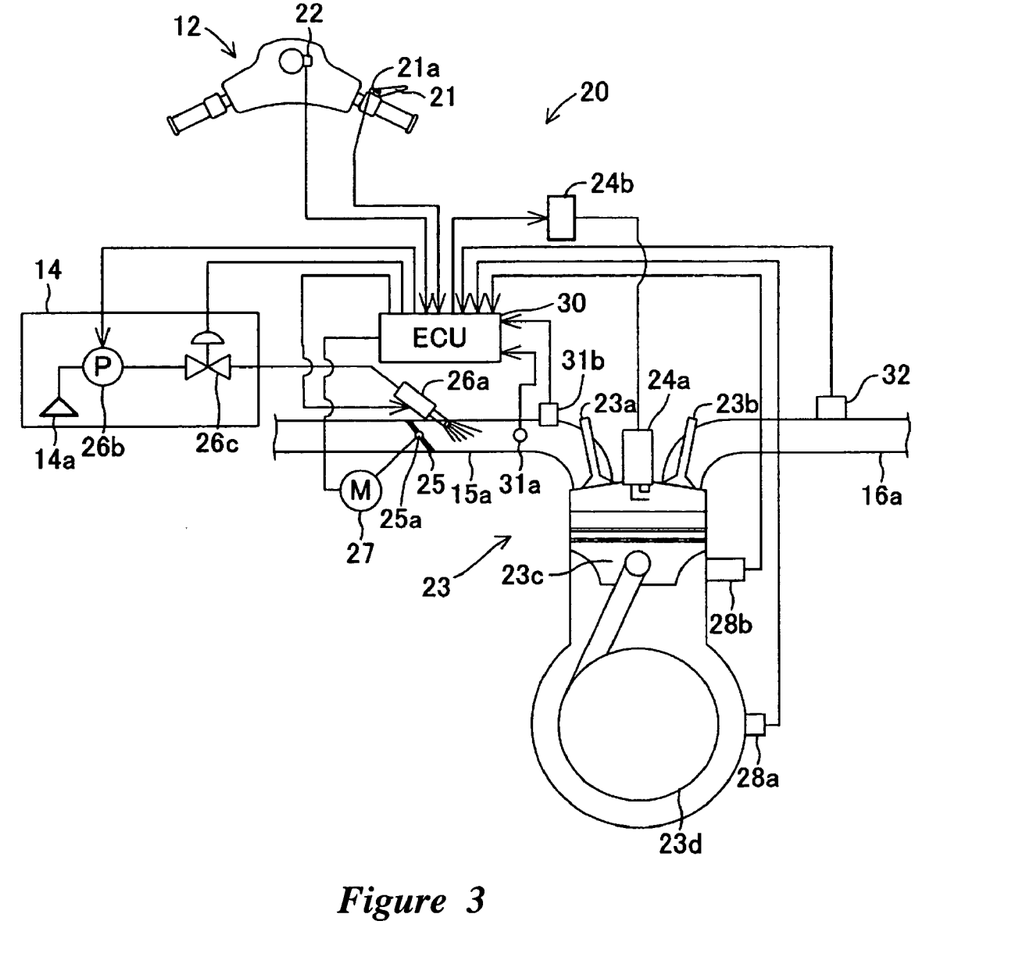
FIG. 3 is a schematic diagram of the engine control device.

In the illustrated embodiment, the engine 23 is a four-stroke, four-cylinder type. However, this is merely one type of engine that can be used with the present inventions. Engines having a different number of cylinders, other cylinder arrangements, various cylinder orientations (e.g., upright cylinder banks, V-type, and W-type), and operating on various combustion principles (e.g., four stroke, crankcase compression two-stroke, diesel, and rotary) are all practicable for use with the inventions disclosed herein. As shown in FIG. 3, the engine 23 draws in through an intake valve 23a, a mixture of fuel and air from the intake device 15 provided on the side of the intake valve 23a. Additionally, the engine 23 discharges exhaust gasses through an exhaust valve 23b, to the exhaust device 16 provided on the side of the exhaust valve 23b.

The fuel and air mixture supplied into the engine 23 through the intake valve 23a is ignited through activation of an ignition device. The ignition device can be any type of ignition device or system. In the illustrated embodiment, the ignition device comprises an ignition or "spark" plug 24a provided on the engine 23.

When the air/fuel mixture is ignited, the mixture combusts and thus causes a piston 23c provided in the engine 23 to make an up and down movement. The movement of the piston 23c causes a crankshaft 23d to rotate. The crankshaft 23d is connected to an impeller shaft 17 through a direct connection or through one or a plurality of additional shafts. As such, the rotational force of the engine 23 is transmitted to the impeller shaft 17 to rotate an impeller (not shown) that is connected to the impeller shaft 17.

The impeller is part of a propulsion device 18 disposed at the rear end of and generally along a longitudinal centerline of the body 11. The rotation of the impeller produces a propulsive force for the water-jet propulsion boat 10. That is, the propulsion device 18 is provided with a water induction port 18a open toward the bottom of the boat body 11. A water ejection port (not shown) propulsion device 18 is open at the stem. Water introduced from the water induction port 18a is jetted out from the water ejection port through rotation of the impeller to produce a propulsive force for the boat body 11.

A steering nozzle 19 is attached to the rear end of the propulsion device 18. The steering nozzle 19 is configured to deflect the water jet ejected from the propulsion device 18 so as to change a running direction of the watercraft 10 to the left and right by moving its rear portion to the left and right in response to the operation of the steering handle 12.

The intake device 15 can include an intake pipe 15a connected to the engine 23, a throttle body 15b connected to the upstream end of the intake pipe 15a, and the like. Air outside the boat body 11 is drawn through an intake air duct 15c and an intake box 15d. The flow of such air can be regulated by opening/closing of a throttle valve 25 provided in the throttle body 15b. As air flows through the intake pipe 15a, it is mixed with fuel. The fuel can be supplied from the fuel tank 14 through a fuel feed device made up of an injector 26a and the like. This type of fuel injection system is known as "port" fuel injection. Other types of fuel injection systems, such as, for example, but without limitation, direct fuel injection, can also be used.

The exhaust device 16 includes an exhaust pipe 16a that can comprises bent pipes connected to the engine 23. A tank-like water lock 16b can be connected to the rear end of the exhaust pipe 16a, so as to suppress water from flowing upstream through the exhaust system.

An exhaust pipe 16c can be connected to the rear of the water lock 16b. The exhaust pipe 16a can extend initially forwardly. In the illustrated engine, one exhaust pipe 16a is provided for each cylinder of the engine 23. These individual exhaust pipes 16a are grouped together on the starboard side of the engine 23, and extend around the front side of the engine 23 toward the port side. On the front or port side of the engine 23, the individual pipes 16a can be merged together to form a common exhaust passage. The common exhaust passage can extend further rearwardly from the read side of the engine 23. However, this is merely one exemplary configuration of the exhaust system. Other configurations can also be used.

The rear end of the common exhaust passage 16a is in communication with the front of the water lock 16b. The exhaust pipe 16c extends rearward from the rear top surface of the water lock 16b. The exhaust pipe 16c first extends upwardly from the rear top surface of the water lock 16b and then downwardly to the rear, the downstream end of which opens to an undersurface of the body 11, near the rear end. One such undersurface can be a side wall of a tunnel in which the propulsion device 18 is disposed. The exhaust device 16 discharges exhaust gas to the outside, with outside water or the like prevented from entering into the engine 23.

In the illustrated embodiment, the throttle valve 25 is formed in the shape of a disc, to the central portion (in its diametric direction) of which is fixed a rotational shaft 25a. The rotational shaft 25a is supported inside the throttle body 15b for rotation, to one end of which is connected a motor 27. Therefore, the throttle valve 25 rotates in normal and reverse directions on the rotational shaft 24a in association with the rotation of the motor 27, to open/close the intake air passage in the throttle body 15b.

Figure 4:
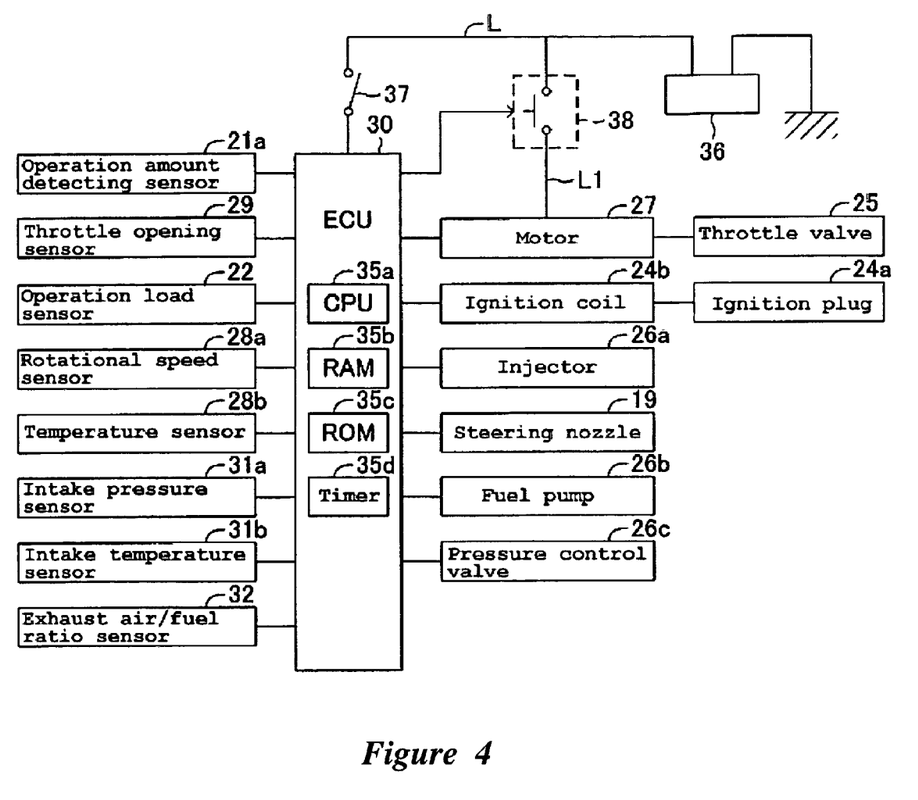
FIG. 4 is a block diagram of the engine control device.

With reference to FIG. 4, the watercraft 10 can also include a limp home mechanism (not shown). Such a limp home mechanism can be configured to act as a means of performing a limp home function when the motor 27 fails to adjust throttle opening to a desired amount. For example, but without limitation, the motor 27 might fail to properly adjust the throttle valve 25 due to an energization abnormality or the like due to breaking of wire of the motor 27 and the like.

The engine control device 20 according to this embodiment is provided, in addition to the foregoing devices, with various devices such as an electronic control unit 30 (hereinafter referred to as an ECU) and the like and various kinds of sensors. In the fuel tank 14, a filter 14a, a fuel pump 26bc and a pressure control valve 26c are disposed. The pressure control valve 26c is connected to the injector 26a, controlling the pressure of fuel whose impurities are filtered and removed by the filter 14a and which is fed to the injector 26a through operation of the fuel pump 26b.

Also, an ignition coil 24b is connected to each ignition plug 24a. The ignition coil 24b sends electric current to the ignition plugs 24a in accordance with ignition timing. In this manner, the ignition plugs 24a discharge electricity to ignite fuel.

In the vicinity of the crankshaft 23d in the engine 23 is provided a rotational speed sensor 28a for detecting the rotational speed of the crankshaft 23d. In the body of the engine 23 is provided a temperature sensor 28b for detecting the temperature of the engine body. In the vicinity of the rotational shaft 24a of the throttle valve 25 is provided a throttle opening sensor 29 (see FIG. 4) for detecting the opening of the throttle valve 25.

In the intake pipe 15a are provided an intake air pressure sensor 31a for detecting the intake air pressure inside the intake pipe 15a and an intake air temperature sensor 31b for detecting the intake air temperature inside the intake pipe 15a. In the exhaust pipe 16a is provided an exhaust air-fuel ratio sensor 32 for detecting the air-fuel ratio in the exhaust pipe 16a.

Figure 5:
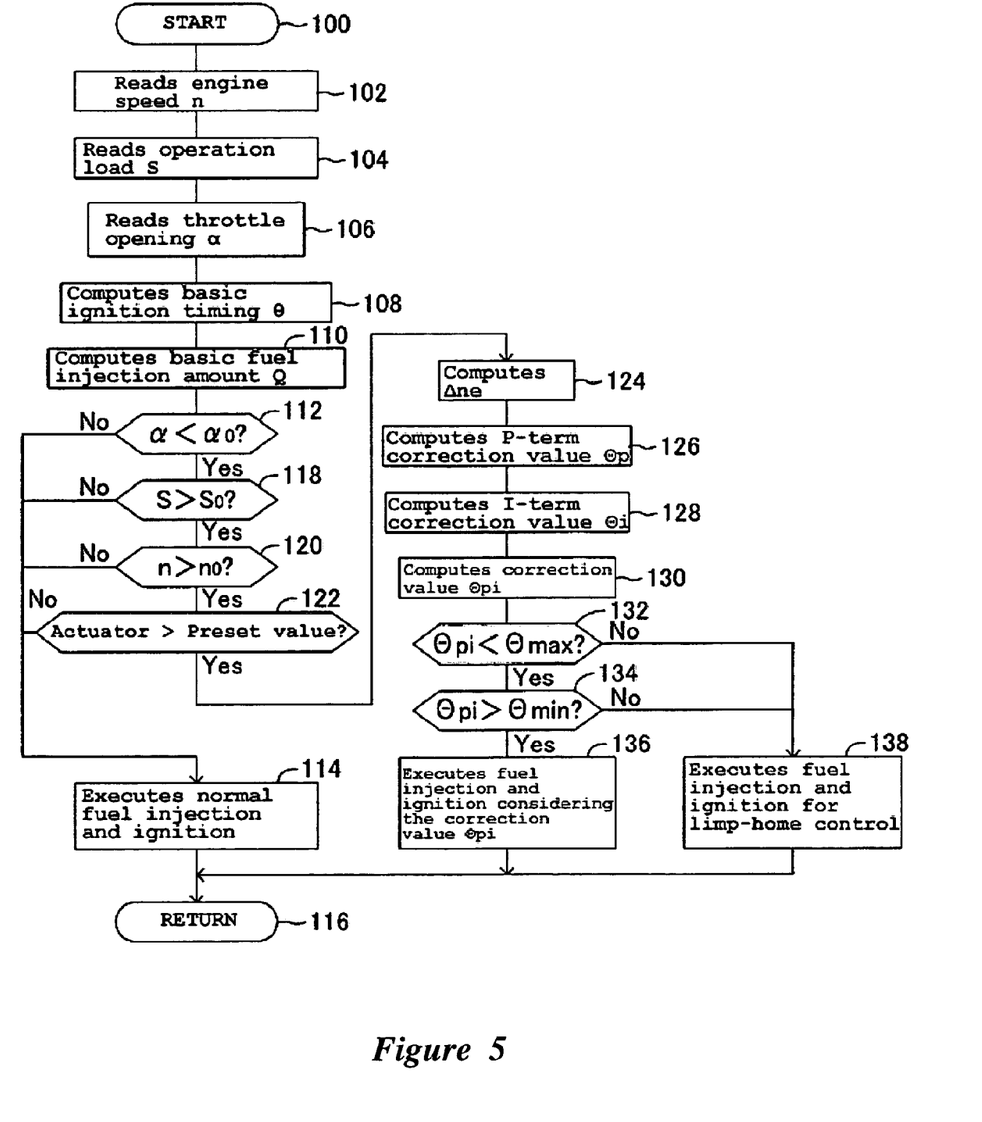
FIG. 5 is a flowchart illustrating a program that can be used in conjunction with the engine control device, or other engine control devices for providing a steering assist mode engine operation, in accordance with an embodiment.

The ECU 30 can include a CPU 35a, a RAM 35b, a ROM 35c, a timer 35d and various kinds of circuitry devices (not shown), as shown in FIG. 5. Detection signals can be input from an amount-of-operation sensor 21a which indicates the condition of operation of the throttle lever 21 and the rotational speed sensor 28a which indicates the rotating condition of the engine 23. The ECU 30 can be configured to process the detection signals from these sensors based on a control map stored in the ROM 35c, transfers control signals to the injector 26a, ignition coil 24b, motor 27, fuel pump 26b, pressure control valve 26c and the like, for the control of fuel injection or ignition timing, as well as of opening of the throttle valve 25. That is, the ECU 30 functions as the mode judgment means, ignition timing control device and fuel injection control device according to one embodiment.

The ECU 30 can be connected to a battery 36 through a power source line L. An ignition switch 37 can be disposed in the power source line L. The ignition switch 37 can be turned on or off by the operation of the boat operator. The electric power is supplied to the ECU 30 when the ignition switch 37 is turned on. Also, the battery 36 can be connected to the motor 27 through a power source line L1. A relay 38 is disposed in the power source line L1. The relay 38 is switched on or off based upon signals sent from the ECU 30. When the relay 38 is switched off, the power supply path (the power source line L1) to the motor 27 is disconnected to stop supplying the power to the motor 27.

During operation, an operator can start the water-jet propulsion boat 10. If the driver sets a main switch (not shown) ON and also manipulates the ignition switch 37 to an ON position, then the watercraft 10 is brought into condition for running; the engine 23 is running at least at idle speed. In this case, the relay 38 is set to be ON and the motor 27 is in the condition for operation. The watercraft 10 runs in a direction according to operator's operation of the steering handlebars 12 at a speed according to operator's operation of the throttle lever 21.

More specifically, operating the steering handlebars 12 causes the steering nozzle 19 to pivot right and left, so that the running direction of the water jet propulsion boat 10 is determined. Squeezing the throttle lever 21 toward the grip 12b increases a throttle opening so that the watercraft 10 accelerates. On the other hand, releasing the throttle lever 21 so as to allow it to move away from the grip 12b reduces the throttle opening so that the watercraft 10 decelerates.

Control of the engine 23 can be performed according to a program illustrated in flowchart form in FIG. 5. The program can optionally be repeated at given time intervals after the ignition switch 37 is set ON.

The program first starts at the Step 100. Then, the program proceeds to the Step 102, where an engine speed n detected by the rotational speed sensor 28a is read. A value indicative of engine speed n can be temporarily stored in the RAM 35b. Next, the program proceeds to the Step 104.

In the Step 104, an operation load S of the steering handlebars 12 detected by the operation load sensor 22 is read. This value can also be stored in the RAM 35b. The program then proceeds to the Step 106.

In the Step 106, a process of reading and storing an opening α of the throttle valve 25 detected by the throttle opening sensor 29 in the RAM 35b can be executed. Then the program proceeds to the Step 108.

Figure 6:
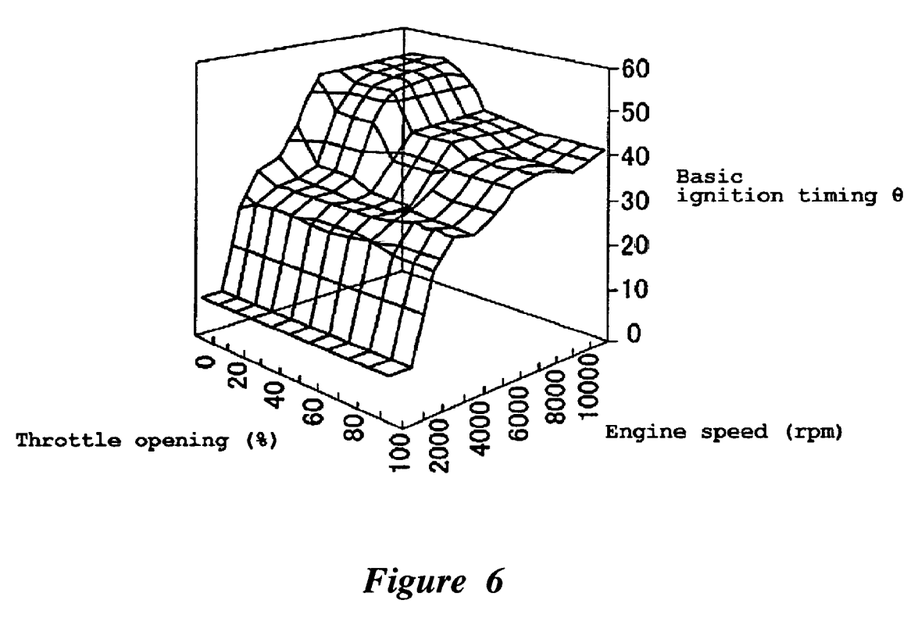
FIG. 6 is a graph illustrating an exemplary multi-dimensional basic ignition timing map that can be used in conjunction with the program of FIG. 5 and/or some embodiments of the engine control device of FIGS. 1–4.

In the Step 108, basic ignition timing θ can be computed. Regarding the basic ignition timing θ, for example, for example, an exemplary multi-dimensional map for computing regular ignition timings is shown in FIG. 6. Such a map can be predetermined and stored in the ROM 35c. The basic ignition timing θ illustrated in FIG. 6 can be determined based upon values of an engine speed (rpm) and a throttle opening (%), in a manner well known in the art. That is, the map for computing the regular ignition timing is made based upon relationships between the basic ignition timing and the throttle opening both at a certain engine speed and relationships between the basic ignition timing and the engine speed at a certain throttle opening.

Figure 7:
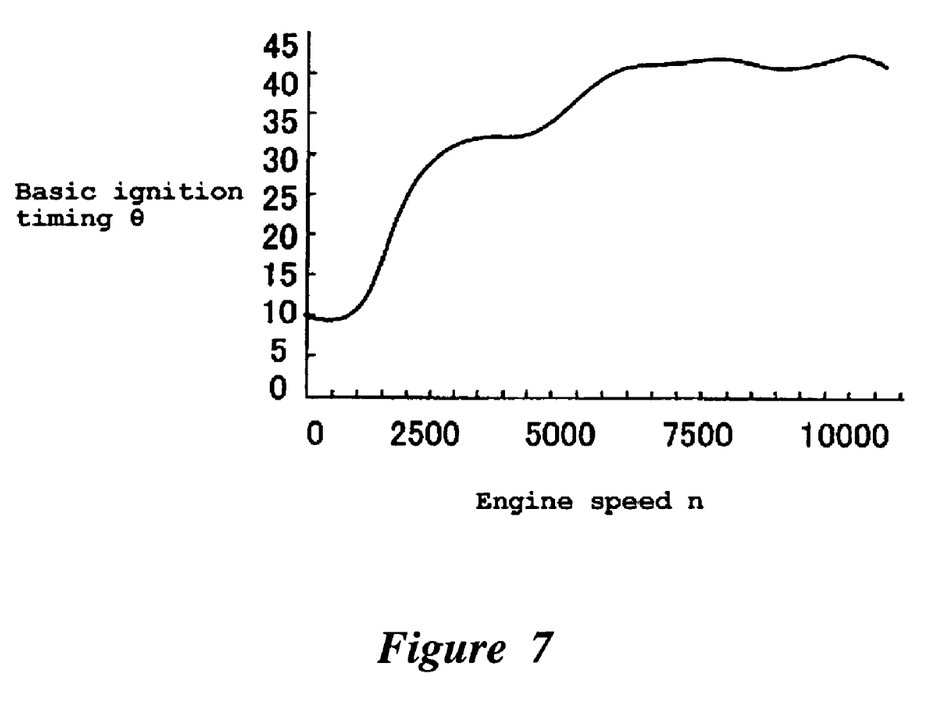
FIG. 7 is a graph illustrating an exemplary relationship between engine speed and basic ignition timing.

In this manner, an optimum basic ignition timing θ when the throttle opening α and the engine speed n are certain values can be computed. The basic ignition timing θ is computed from the engine speed n obtained in the process of the Step 102 and the throttle opening α obtained in the process of the Step 106. The computed value of the basic ignition timing θ can be stored in the RAM 35b. As used herein, the term "basic ignition timing θ" is intended to mean the timing at which each ignition plug 24a ignites the mixture supplied to the engine 23, and is indicated by an angle before "0 degrees" which is defined as the top dead center (TDC) of the piston 23c. An example of the relationships between the basic ignition timing θ and the engine speed n during a typical acceleration of the watercraft 10 is shown in FIG. 7.

The program then proceeds to the Step 110 to compute a basic fuel injection amount Q. Regarding the basic fuel injection amount Q, a map for computing a basic fuel injection amount (not shown) can be predetermined and stored in the ROM 35c. The basic fuel injection amount Q can be based upon a map for computing the basic fuel injection amount. The basic fuel injection amount Q means the injection amount of fuel that is supplied to the engine 23 from each injector 26a. The map for computing the basic fuel injection amount can be prepared as a three or more dimensional map that shows the relationships among the engine speed n, the throttle opening α and the fuel injection amount Q.

Thus, a basic fuel injection amount Q that can achieve an optimum engine speed n can be computed from the engine speed n obtained in the process of the Step 102 and the throttle opening α obtained in the process of the Step 106. The computed value of the basic fuel injection amount Q can also be stored in the RAM 35b. Also, on this occasion, although not depicted in FIG. 5, a computation of fuel injection timing can be conducted together with the computation of the basic fuel injection amount Q.

The program then proceeds to the Step 112, where the CPU 35a determines whether or not the throttle opening α determined in the process of the Step 106 is smaller than a preset value α0. The preset value α0 is set to be an opening of the throttle valve 25 to which the throttle valve 25 pivots when the operator only slightly squeezes the throttle lever 21 toward the grip 12b. When the throttle opening α is greater than the preset value α0, it is determined that the operator is intentionally operating the throttle lever 21 to accelerate the watercraft 10. On the other hand, when the throttle opening α is smaller than the preset value α0, it is determined that the operator is not intentionally operating the throttle lever 21.

For example, in the Step 112, a determination is made as to whether or not the water jet propulsion boat 10 is coasting, which can be used to decide whether or not the watercraft 10 should be in a steering-assist control mode. When the throttle opening α is greater than the preset value α0, then "NO" is the result of determination in the Step 112 and the program proceeds to the Step 114.

In the Step 114, the injector 26a injects the fuel based upon the basic fuel injection amount Q and the basic fuel injection timing both computed in the process of the Step 110. Additionally, a process to control the ignition timing of the ignition plug 24a is conducted based upon the basic ignition timing θ computed in the process of the Step 108. In this manner, the engine 23 starts normal operation. The program then proceeds to the Step 116 and temporarily ends and/or returns.

The program is again started from the Step 100 and proceeds to the Step 102. Thereafter, the same processes as the steps 102–112 can be conducted to renew the obtained values of the engine speed n, the operation load S and the throttle opening α and to compute a basic ignition timing θ, a basic fuel injection amount Q and a basic fuel injection timing corresponding to the values. Those renewed values can be stored in the RAM 35b.

With reference again to the Step 112, a determination is made as to whether or not the throttle opening α is smaller than the preset value α0. While the throttle opening α is greater than the preset value α0, a normal fuel injection and ignition process continues in the Step 114. In this scenario, fuel injection and ignition are executed based on the renewed values of the basic ignition timing θ, basic fuel injection amount Q and basic fuel injection timing.

On the other hand, when the throttle opening α is smaller than the preset value α0, then "YES" is the result of the determination in the Step 112 and the program proceeds to the Step 118. In the Step 118, a determination is made as to whether or not the operation load S of the steering handlebars 12 (detected by the operation load sensor 22 in the execution of the preceding Step) is greater than a preset value S0. The preset value S0 can be set to a value greater than the operation load applied when the operator turns the steering handlebars 12 during normal operation of the boat. When the operation load S is greater than the preset value S0, control changes from normal mode to a steering assist mode.

For example, the steering assist mode control can be a control mode or method in which the speed of the engine 23 is increased when the steering handlebars 12 are turned by a greater amount than normal. In some embodiments, the steering assist mode can be triggered when the operator turns the handlebars 12 to a maximum position and applies additional pressure on the handlebars 12. With either configuration, the watercraft 10 temporarily produces additional thrust so that steerability is improved.

In the present embodiment, when the operation load S for normal steering is "0" for example, the preset value S0 is set to "0". When the steering handlebars 12 are turned to a maximum steering angle position where the operation load S exceeds "0," the control can be changed to a steering assist mode. Alternatively, the preset value S0 may be an operation load S at which a steering angle achieves a predetermined angle. In such case, thrust produced by the water jet propulsion boat 10 can be increased according to the amount of the operation load S.

When the operation load S is smaller than the preset value S0, then "NO" is the result of the determination of the Step 118 and the program proceeds to the Step 114 and the foregoing processes are repeated thereafter. On the other hand, when "YES" is the result of the determination of the Step 118, the program proceeds to the Step 120.

In the Step 120, a determination is made as to whether or not the engine speed n determined in the process of the Step 102 is higher than a preset value n0 in the most recent execution of the program. The preset value n0 can be set as a threshold value to determine whether or not correction is required for the engine speed, and when the engine speed n is not higher than the preset value n0, it is determined that no correction is required.

When the engine speed n is not higher than the preset value n0 in the Step 120, "NO" is the result of the determination and thus the program proceeds to the Step 114. On the other hand, when the engine speed n is higher than the preset value n0, "YES" is the result of the determination and the program proceeds to the Step 122.

In the Step 122, a determination is made as to whether or not a value of an actuator is greater than a preset value. For example, but without limitation, the value of the actuator can be computed based on the speed of the motor 27, an opening of the throttle valve 25 or the like. In this embodiment, a value can be computed based on the speed of the motor 27. The preset value in this case is also set as a threshold value to determine whether or not correction is required for the engine speed.

When the value of the actuator is not greater than the preset value in the Step 122, "NO" is the result of this determination and the program proceeds to the Step 114. On the other hand, when the value of the actuator is greater than the preset value, "YES" is the result and the program proceeds to the Step 124.

In the Step 124, a process of determining a difference Δne between the values of the engine speed n and a target engine speed n1 is executed. Then in the Step 126, a P-term correction value Θp is computed according to the computed difference Δne. The P-term correction value Θp can be determined based on Table 1 below.

TABLE 1

|  | Δne(1) | ... | Δne(n) |
|---|---|---|---|
| P-term correction | Θp1 | ... | Θpn |

For example, in the Table 1, the difference Δne is differentiated into difference Δne(1) to difference Δne(n), and the P-term correction value Θp corresponding to each difference value is differentiated as P-term correction value Θp1 to P-term correction value Θpn. In addition, in the Table 1, the difference Δne(1) is smaller than the difference Δne(n), and the P-term correction value Θp1 is smaller than the P-term correction value Θpn, and the P-term correction value Θp is set as the value in proportion to the corresponding difference Δne.

The P-term correction value Θp thus becomes greater for a greater difference between the values of the engine speed n and the target engine speed n1. In some embodiments, when the difference Δne is a positive value, ignition timing is corrected toward a retarded timing (fewer degrees before TDC). Meanwhile, when the difference Δne is a negative value, or when the value of the engine speed n is smaller than the target engine speed n1, the ignition timing is adjusted toward a more advanced timing (more degrees before TDC).

Then, the program proceeds to the Step 128, where an I-term correction value Θi is computed according to the difference Δne. The I-term correction value Θi can be determined based on Table 2 below.

TABLE 2

|  | Δne(1) | ... | Δne(n) |
|---|---|---|---|
| I-term correction | Θi1 | ... | Θin |

In the Table 2, the difference Δne is differentiated into difference Δne(1) to difference Δne(n), and the I-term correction value Θi is differentiated into I-term correction value Θ)i1 to I-term correction value Θin. In addition, in the Table 2, the difference Δne(1) is smaller than the difference Δne(n), and the I-term correction value Θi1 is smaller than the I-term correction value Θin, and the I-term correction value Θi is set as the value integrated by the corresponding difference Δne. The I-term correction value Θi thus becomes greater for a greater difference between the values of the engine speed n and the target engine speed n1. In some embodiments, when the difference Δne is a positive value, ignition timing is corrected toward a more retarded timing. On the other hand, when the difference Δne is a negative value, the ignition timing is adjusted toward a more advanced timing.

Then the program proceeds to the Step 130, where a steering assist mode ignition timing correction value Θpi is computed based on the P-term correction value Θp determined in the process of the Step 126 and the I-term correction value Θi determined in the process of the Step 128. The steering assist mode ignition timing correction value Θpi can be computed by the following equation 1.

$$\Theta pi(n) = \Theta p(n) + \Theta i \quad \text{Equation 1}$$

Further, the I-term correction value Θi can be expressed by the following equation 2, and the computation of the equation 2 can be executed at predetermined short time intervals. More specifically, the steering assist mode ignition timing correction value Θpi can be determined as the sum of the P-term correction value Θp and the I-term correction value Θi.

$$\Theta i = \Theta i(n-1) + \Theta i(n) \quad \text{Equation 2}$$

In the Step 130, when the computing process of the steering assist mode ignition timing correction value Θpi is completed, the program proceeds to the Step 132. In the Step 132, a determination is made as to whether or not the steering assist mode ignition timing correction value Θpi determined in the process of the Step 130 is smaller than a maximum correction value Θmax. The maximum correction value Θmax can be the value which represents an upper limit for which the engine speed n can be corrected by the steering assist mode ignition timing correction value Θpi.

When the steering assist mode ignition timing correction value Θpi is not smaller than the maximum correction value Θmax, it is determined that the engine speed sensor 28a or the like has failed or another failure has occurred, causing the engine speed n detected by the engine speed sensor 28a to be significantly greater than the target engine speed n1.

When the steering assist mode ignition timing correction value Θpi is smaller than the maximum correction value Θmax, then "YES" is the result of the determination in the Step 132 and the program proceeds to the Step 134, where determination is made as to whether or not the steering assist mode ignition timing correction value Θpi determined in the process of the Step 130 is greater than a minimum correction value Θmin. The minimum correction value Θmin is the value which represents a lower limit for which the engine speed n can be corrected by the steering assist mode ignition timing correction value Θpi. When the steering assist mode ignition timing correction value Θpi is not greater than the minimum correction value Θmin, it is determined that the speed sensor 28a or the like has failed or another failure has occurred, as with when the steering assist mode ignition timing correction value Θpi is greater than the maximum correction value Θmax.

When the steering assist mode ignition timing correction value Θpi is greater than the minimum correction value Θmin, then "YES" is the result in the Step 134 and the program proceeds to the Step 136. In the Step 136, a process can be executed in which fuel is injected from the injector 26a based on the values of the basic fuel injection amount Q and the basic fuel injection timing computed in the process of the Step 110 in the most recent execution of the program. Additionally, the ignition timing of the ignition plug 24a can be controlled for ignition, based on the value of the basic ignition timing θ computed in the process of the Step 108 plus or minus the steering assist mode ignition timing correction value Θpi determined in the process of the Step 130.

While the engine control device 20 is in steering assist mode, "YES" is the result of the determination in the steps 120, 122, 132 and 134, the fuel injection and the ignition are repeated considering the steering assist mode ignition timing correction value Θpi computed in each case. In this event, when the steering assist mode ignition timing correction value Θpi is a positive value, the basic ignition timing θ is adjusted toward a more retarded timing. On the other hand, when the steering assist mode ignition timing correction value Θpi is a negative value, the basic ignition timing θ is adjusted toward a more advanced timing.

Meanwhile, when trouble occurs in the devices configuring the engine control device 20 and "NO" is the result of the determination in the Step 132 or 134, the program proceeds to the Step 138. In the Step 138, a process in the event of abnormality is executed.

This process can be a limp-home control operation, for example. The limp-home control can be executed in a way such that a mechanism (not shown) brings the opening of the throttle valve 25 to a preset throttle opening α when the relay 38 is deactivated and the motor 27 is not operable, and the relay 38 is deactivated by the control of the ECU 30. The opening of the throttle valve 25 thus achieves the preset opening for the limp-home control.

Thus, in the Step 138, a process of injecting fuel from the injector 26a and controlling the ignition timing of the ignition plug 24a based on preset values of the fuel injection amount, the fuel injection timing and the ignition timing is executed as the process for the limp-home control. Then, after the fuel injection and the ignition are completed, the program proceeds to the Step 116 to end and/or return. The program starts again from the Step 100, and as long as "NO" is the result of the determination in the Step 132 or 134, the process for the limp-home control of the Step 138 is executed.

As described above, in the engine control device 20 in accordance with this embodiment, since the steering assist mode ignition timing correction value Θpi is computed based on known PI control and used for the steering assist mode control, variation in the engine speed n caused by mechanical tolerance and ambient conditions can be restricted in a simple manner. Therefore, the occurrence of variation in the engine speed n can be prevented, without cost increase and poor maintainability due to a complicated structure and increased accuracy requirement of the engine 23, so that appropriate thrust is produced from the engine.

Further, in the engine control device 20, the steering assist mode ignition timing correction value Θpi has the maximum correction value Θmax and the minimum correction value Θmin, and the ignition timing correction control is executed when the steering assist mode ignition timing correction value Θpi is between the maximum correction value Θmax and the minimum correction value Θmin. This can prevent the correction process from being endlessly repeated when the variation occurs in the engine speed n due to mechanical trouble or the like, and allows control for such event. Further, in the watercraft 10 in accordance with this embodiment, since the engine speed n when the engine is in steering assist mode is controlled to approximate the preset target engine speed n1, stable thrust can be provided and steerability is improved.

The engine control device 20 according to the present invention is not limited to the embodiment described above and can be practiced with proper modifications. For example, in the foregoing embodiment, the steering assist mode ignition timing correction value Θpi is computed based on the PI control, but this may be computed using PID control which considers a derivative-term correction value. This allows more accurate correction control. Further, the steps 120 and 122 in the flowchart of FIG. 5 can be omitted or only one of them can be used. Also, the arrangement, structure and the like of the portions which configure the engine control device according to the present invention may be modified as appropriate within the technical scope of the present invention.

With respect to the use of PI or PID control, since the correction control using the known proportional-plus-integral control is used for the steering assist mode control, variation in engine speed caused by mechanical tolerance, ambient conditions and the like can be restricted in a simple manner. Thus, the occurrence of variation in the engine speed can be prevented, without cost increase and poor maintainability due to a complicated structure and increased accuracy requirement of the engine, so that appropriate thrust is produced from the engine.

Additionally, as noted above with reference to at least some of the embodiments disclosed herein, the present control device can utilize a correction value for the ignition timing correction control, which is executed by the ignition timing control device based on the value computed based on the difference between the detection value from the rotational speed detection device and the preset target engine speed, can have an upper limit and a lower limit, and the ignition timing correction control can be executed when the correction value is between the upper limit and the lower limit.

This can prevent the correction process from being endlessly repeated when the engine speed fails to become lower or higher than the target speed due to mechanical trouble or the like. For example, in at least some of the embodiments disclosed herein, when the correction value is greater than the upper limit or smaller than the lower limit, it is determined that a device such as a sensor has some failure, and alternative control, for example, limp-home control, is executed.

Further, although the present inventions have been disclosed in the context of certain preferred embodiments, features, aspects, and examples, it will be understood by those skilled in the art that the present inventions extend beyond the specifically disclosed embodiments to other alternative embodiments and/or uses and obvious modifications and equivalents thereof. In addition, while a number of variations have been shown and described in detail, other modifications, which are within the scope of the present inventions, will be readily apparent to those of skill in the art based upon this disclosure. It is also contemplated that various combinations or subcombinations of the specific features and aspects of the embodiments may be made and still fall within the scope of the present inventions. Accordingly, it should be understood that various features and aspects of the disclosed embodiments can be combined with or substituted for one another in order to form varying modes of the present inventions. Thus, it is intended that the scope of the present inventions herein disclosed should not be limited by the particular disclosed embodiments described above.

What is claimed is:

1. An engine control device comprising a throttle opening detection device configured to detect an opening of a throttle valve, an operation load detection device configured to detect an operation load of steering handlebars, a rotational speed detection device configured to detect a speed of an engine, an engine speed control device configured to increase the speed of an engine when a value detected by the throttle opening detection device is smaller than a predetermined value and a value detected by the operation load detection device is greater than a predetermined value, and an ignition timing control device configured to compute a difference between a detection value from the rotational speed detection device and a preset target engine speed and to adjust ignition timing of an engine based on the computed value, wherein the engine speed is increased by the control of the engine speed control device.

2. The engine control device according to claim 1, wherein the engine speed control device is configured to increase the engine speed to provide steering assist when the value detected by the throttle opening detection device is smaller than the predetermined value and the value detected by the operation load detection device is greater than the predetermined value.

3. The engine control device according to claim 1, wherein the ignition timing control device is configured to determine a correction value for adjusting ignition timing with a proportional-plus-integral method.

4. The engine control device according to claim 2, wherein the ignition timing control device is configured to determine a correction value for adjusting ignition timing with a proportional-plus-integral method.

5. The engine control device according to claim 1, wherein the ignition timing control device is configured to adjust the ignition timing only when a correction value for the ignition timing correction is between the upper limit and the lower limit.

6. The engine control device according to claim 2, wherein the ignition timing control device is configured to adjust the ignition timing only when a correction value for the ignition timing correction is between the upper limit and the lower limit.

7. The engine control device according to claim 3, wherein the ignition timing control device is configured to adjust the ignition timing only when a correction value for the ignition timing correction is between the upper limit and the lower limit.

8. The engine control device according to claim 1, where ignition timing control device is configured to retard ignition timing when the detection value from the rotational speed detection device is greater than the target engine speed and to advance ignition timing when the detection value from the rotational speed detection device is less than the target engine speed.

9. The engine control device according to claim 2, wherein ignition timing control device is configured to retard ignition timing when the detection value from the rotational speed detection device is greater than the target engine speed and to advance ignition timing when the detection value from the rotational speed detection device is less than the target engine speed.

10. The engine control device according to claim 3, wherein ignition timing control device is configured to regard ignition timing when the detection value from the rotational speed detection device is greater than the target engine speed and to advance ignition timing when the detection value from the rotational speed detection device is less than the target engine speed.

11. The engine control device according to claim 5, wherein ignition timing control device is configured to regard ignition timing when the detection value from the rotational speed detection device is greater than the target engine speed and to advance ignition timing when the detection value from the rotational speed detection device is less than the target engine speed.

12. The engine control device according to claim 1 in combination with a water jet propulsion boat.

13. The engine control device according to claim 2 in combination with a water jet propulsion boat.

14. The engine control device according to claim 3 in combination with a water jet propulsion boat.

15. The engine control device according to claim 5 in combination with a water jet propulsion boat.

16. The engine control device according to claim 8 in combination with a water jet propulsion boat.

* * * * *

UNITED STATES PATENT AND TRADEMARK OFFICE
CERTIFICATE OF CORRECTION

PATENT NO. : 7,207,856 B2 Page 1 of 1
APPLICATION NO. : 11/083290
DATED : April 24, 2007
INVENTOR(S) : Yasuhiko Ishida et al.

It is certified that error appears in the above-identified patent and that said Letters Patent is hereby corrected as shown below:

On Page 3, Col. 1, Line 1, under "Other Publications", after "2006", please insert -- . --.

At Col. 3, Line 23, please delete "and or" and insert -- and/or --, therefor.

At Col. 9, Line 43, please delete "Θ)il" and insert -- Θil --, therefor.

At Col. 14, Line 10, in Claim 10, please delete "regard" and insert -- retard --, therefor.

At Col. 14, Line 17, in Claim 11, please delete "regard" and insert -- retard --, therefor.

Signed and Sealed this

Nineteenth Day of August, 2008

JON W. DUDAS
*Director of the United States Patent and Trademark Office*